May 30, 1967 G. O. HANDBERG 3,323,124
GUIDANCE CONTROL SIGNAL DEVELOPING APPARATUS
Filed Sept. 1, 1964 2 Sheets-Sheet 1

INVENTOR.
GORDON O. HANDBERG
BY Gordon O. Reed
ATTORNEY 3,323,124
GUIDANCE CONTROL SIGNAL DEVELOPING
APPARATUS
Gordon O. Handberg, Anoka, Minn., assignor to
Honeywell Inc., a corporation of Delaware
Filed Sept. 1, 1964, Ser. No. 393,649
12 Claims. (Cl. 343—108)

The present invention pertains to apparatus for guiding an aircraft to a landing. The invention may be utilized in an automatic flight control system to provide automatic guidance for the aircraft or the invention may also be used in a flight indicating system by means of which the pilot by observing an indicator can guide the aircraft to a landing. The apparatus of the present invention provides for flight path guidance for controlling an aircraft to follow a beam defined by an instrument landing system (I.L.S. transmitter). The beam may be either a glide path or localizer beam.

By way of background, an I.L.S. glide-slope transmitter sends out two radio beams from the nominal touchdown point on the runway upwards along the nominal aircraft approach path. These beams are arranged so that they combine to form a null along a fixed angle of approach, and signals proportional to angular deviation of an aircraft both above and below that null may be obtained. An aircraft has an airborene I.L.S. glide-slope receiver which senses this angular deviation and makes available to an automatic pilot coupler or to the pilot's indicating instrument, the magnitude and direction of the angular deviation. Since this signal represents an angular deviation and airplanes respond in a translational manner, there obviously is a difference in response characteristics at different distances from the glide-slope transmitter. That is, the gain of this beam-following system increases as the aircraft flies into the apex of the transmitted signal. This glide path receiver gain, $K/R$, is inversely proportional to range from the transmitter (R). For example, for a large value of (R) and with a given angular deviation signal due to the craft being off the beam, we may take a linear measurement of the craft from the beam. If the (R) is now decreased but if the linear distance in the same direction be the same as previously, it is evident that the deviation error signal increases. In other words the output of the receiver increases as the craft approaches the transmitting station, for the same linear displacement of the craft from the beam.

An object of this invention is to provide a coupler between the I.L.S. radio receiver and an automatic pilot, or an indicator, which modifies the signal from the radio receiver so that the output of the coupler to the automatic pilot or indicator is the same for the same linear displacement of the craft from the beam for various (R) or range values.

Another object of this invention is to provide an improved coupled having means to provide a continuous internal adjustment of system gain.

Another object of this invention is to utilize this means of system gain adjustment to achieve stable automatic beam following at distances closer to the transmitter, and therefore at lower altitudes, than is possible with couplers in which gain is not adjusted.

Another object of this invention is to utilize this means of system gain adjustment to achieve constant aircraft response characteristics at all aircraft distances from the transmitter.

A further object of this invention is to provide variable gain means responsive to the output of an I.L.S. radio receiver which gain means provides an output for various magnitudes of signals from the receiver, having a desirable gain level.

A further object of this invention is to provide an adaptive coupler responsive to the output of a radio receiver and to rate of change of position of an aircraft to provide a desirable gain level on the radio receiver signal for various range distances of the craft from a transmitting station.

A further object of this invention is to provide compensation for variations in beam widths in different I.L.S. transmitting facilities.

A further object of this invention is to provide the said adjustable gain coupling function to either a glide-slope radio receiver output or a localizer radio receiver output or both.

The above and further objects of the invention will be evident upon review of the following specification taken in connecton with the sub-joined drawings.

In said drawings.

Figure 1:
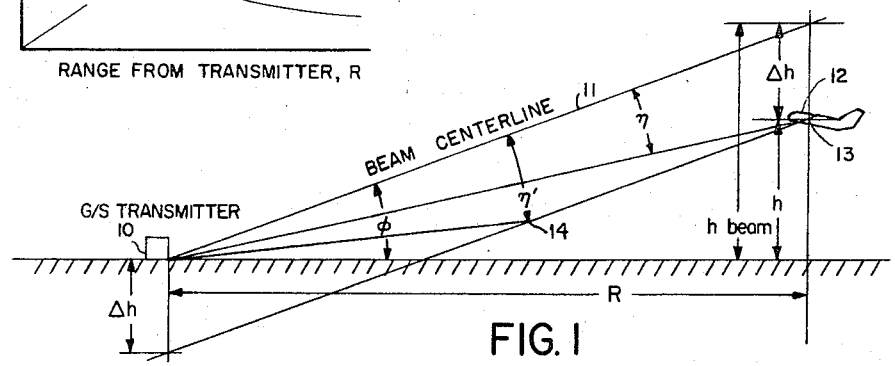
FIGURE 1 illustrates the position of an aircraft with respect to a glide path beam.

In FIGURE 1, a center line 11 of a glide path beam is provided by beams transferred from an I.L.S. transmitting station 10, convenient to a landing area for the aircraft. The aircraft 12 at the moment is at a given point 13 with a horizontal range (R) and altitude $h$. The altitude of the craft at point 13 from the beam center line ($\Delta h$) is a linear distance. The beam altitude for the given range (R) is $h_{beam}$. The craft angular departure from the center line 11 is denoted as $\eta$ and the angular measure of the beam center line above the horizontal is $\phi$. From inspection of FIGURE 1 it will be apparent that as the craft 12 reaches a second point 14 while having the same linear distance or altitude displacement ($\Delta h$) from the beam center line, it has a greater angular deviation $\eta^1$ or angular departure in time from that at position 13.

Figure 2:
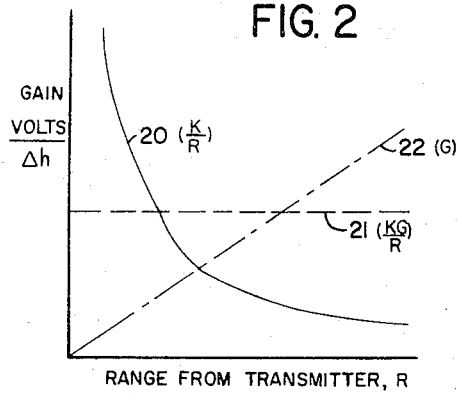
FIGURE 2 illustrates the relationship of various gain devices of the coupler and I.L.S. radio receiver.

In FIGURE 2, which is a graph of various gain quantities, the abscissa values are horizontal range (R) from the transmitter and the ordinates are gain values such as volts per foot below the beam center. Solid line curve 20 in FIGURE 2 shows how the radio receiver gain varies inversely with range; that is, the output is greatest at low range value for the same altitude departure from the beam. Dotted line 21 illustrates the desired total gain of the radio receiver and I.L.S. coupler. Line 22 illustrates the required gain that is to be placed in series with the receiver gain to provide the desired gain of radio receiver and coupler on line 21.

A functional representation of the system is shown in block diagram in FIGURE 3 wherein the portion above the dashed line represents both the airplane dynamics or its physical response while in flight to elevator deflection and geometry of the approach, whereas the portion below the dashed line illustrates the novel adaptive coupler mechanism of this application. Thus in the figure, and considered with respect to the aircraft dynamics, the aircraft combined with the auto pilot 30 in response to an aircraft elevator deflection command, $\delta_c$, undergoes a flight path angular rate, $\dot{\gamma}$ which, for notation, is represented as applied to gain device 32, with the transfer function or gain $$U_1/57.3$$

to provide an output on conductor 33 corresponding with altitude acceleration, $\ddot{h}$, of the craft. This quantity is represented as being supplied to an integrator 34 which thus supplies its output on conductor 35 as altitude rate $\dot{h}$. The altitude rate on transmission means 35 is supplied to a summing device 36 which has a second input from conductor 37 in accordance with the glide beam altitude rate in the aircraft dynamics and beam relationship. The theoretical output of summing device 36 is supplied via conductor 38 to a second integrator 40 which supplies an output $\Delta h$ FIGURE 1 in the form of a physical displacement, to the glide slope receiver 43 having the inherent gain $K/R$, where $$R = R_0 - \frac{U_1}{s}$$

The sensed angular output (E) of the I.L.S. radio receiver 43 which is a tangible quantity representing craft angular displacement from beam center, $\eta$, is supplied over transmission means 44 to a variable gain or variable amplification factor device 45. Gain is the ratio of output to input and variable gain is the varying of the output for the same input. The control of gain of device 45 embodies the essence of the invention. Device 45 in turn supplies its output over transmission means 46, phasing network 47, gain device 48, which determines the ratio of input thereto and output therefrom, to the automatic pilot for control of an elevator operating servomotor on an aircraft or to a glide slope indicator.

The output on transmission means 46 for control of the gain device 45 is also supplied through transmission means 50 to a down logic gain adjusting path 51 of an adaptive gain changer. The signal on transmission means 50 is initially supplied to a high pass network or high pass filter 52 and thence through conductor 53, gain device 54, absolute value device such as a full wave rectifier 56, transmission means 57, to a summing device 58.

Summing device 58 receives a second input from the gain up logic path 60 of the adaptive gain changer. The input to the up logic path is derived for example from an aircraft vertical velocity sensor 62. This input is supplied in one case from sensor 62 directly to a summing device 64 through transmission means 63 and is also supplied through a lag device or low pass filter 65 and thence through transmission means 66 to summing device 64. The output $\Delta \dot{h}$ of summing device 64 is supplied to lag device or low pass filter 68 and thence through the full wave rectifier or absolute value arrangement 69, gain device 70, transmission means 71 to summing device 58. The output of summing device 58 on transmission means 72, for adjusting gain in accordance with the difference of the outputs of the up and down logic paths 51, 60, is supplied in one instance through integrator 73 to a summing device 74 which has a second input supplied thereto through the transmission means 72, transmission means 77, gain device 78, transmission means 79. The output from summing device 74 is supplied through lag device or low pass filter whereby a phase lag is provided between input and output 81 which adjusts the magnitude of variable gain device or variable attenuator 45 in accordance with the relative outputs of the up logic and down logic paths 60, 51 of the gain changing arrangement.

The concepts utilized in the adaptive gain changer having the up logic path 60 and the down logic path 51 to adjust the gain device 45 to modify the glide path radio receiver signal E on transmission means 44 to provide the desired output on transmission means 46 for automatic pilot or indicator control are considered below.

In block diagram functional form, a glide-slope radio receiver on the aircraft looks like:

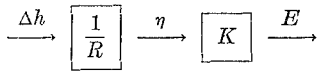

Figure 3:
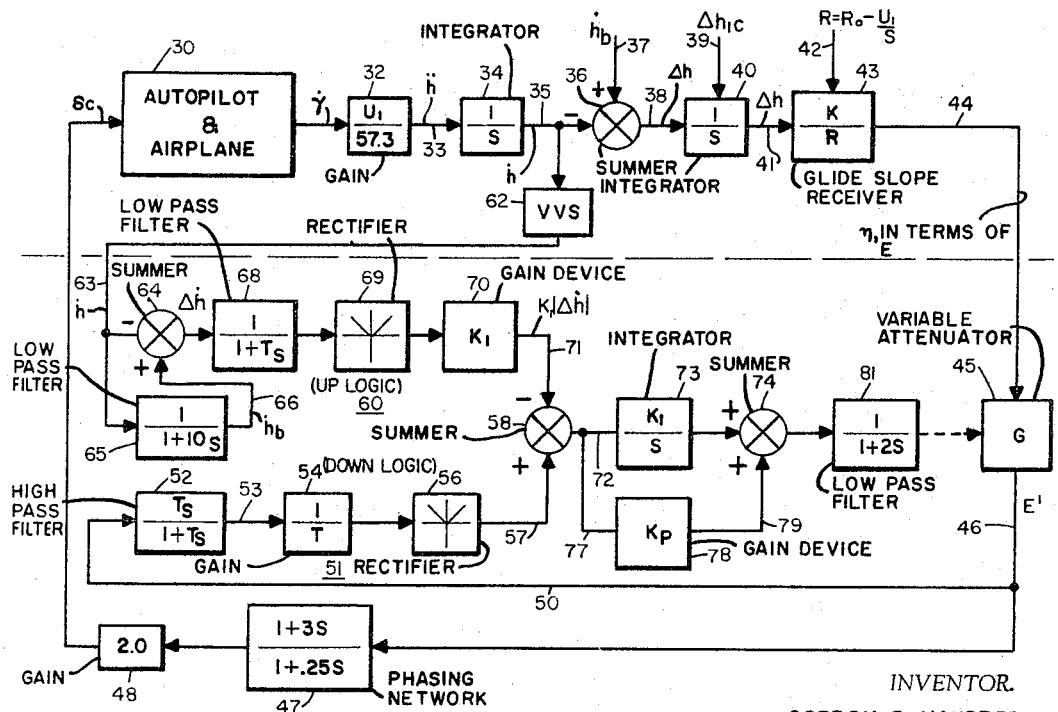
FIGURE 3 is a block diagram of the novel I.L.S. coupler along with a representation of aircraft dynamics.

Whereas in FIGURE 1 and FIGURE 3:

$\Delta h$=height of airplane below glide path beam center, feet,
$\eta$=angular deviation of airplane from beam center, radians,
$R$=horizontal range of aircraft from the glide slope transmitter,
$E$=receiver output, which is sent to the autopilot as a feedback, bolts,
$K$=receiver gain, volts/radian (constant), and small-angle assumptions are valid.

Combining the transfer functions denoting geometry and radio receiver response, system gain relating output to input here is then, for small angles, (1) $$\frac{E}{\Delta h} = \frac{K}{R}$$

which varies with R. By applying to E the above mentioned adaptive series gain, G, the system becomes (2) $$\xrightarrow{\Delta h} \boxed{\frac{1}{R}} \xrightarrow{\eta} \boxed{K} \xrightarrow{E} \boxed{G} \xrightarrow{E'}$$

and the system gain is now the product of the gain devices 43, 45, with outputs shown in FIGURE 2:

(2a) $$\frac{E'}{\Delta h} = \frac{KG}{R}$$

which, for proper variation of G, herein provided by the adaptive gain changer, E' consequently remains constant for all magnitudes of R for the same linear displacement of the craft from beam center, $\Delta h$.

The problem of properly varying G without knowing the present horizontal range R is solved by the novel adaptive gain changer of FIGURE 3 which although being applied to the pitch channel may also be applied to the localizer channel.

Thus since the localizer system is so similar to the glide-slope system in operation, only one, the glide-slope (or pitch axis) system, of FIGURE 3 will be considered in detail here. It is considered moreover to be the more critical.

*Gain changer logic.*—Because there exists a fixed relationship $$\frac{\Delta h}{R} = \eta$$

between the geometric position $\Delta h$ of a point 13 near the beam and angle $\eta$ sensed by the receiver (depending on the range, R) it should be possible to use this relationship, without explicitly knowing R, to vary the gain G such that the total system gain of coupler and aircraft, $KG/R$, remains constant at some desirable value. Call this desirable value of system gain $K_1$, such that:

(3) $$K_1 = \frac{KG}{R}$$

from (2a)

(4) $$\frac{E'}{\Delta h} = K_1$$

which may be expressed in the form (5) $$E' - K_1 \Delta h = 0$$

This expression for an ideal system gain could form the logic for a gain changing function as provided in FIGURE 3. By sensing values of E' and $\Delta h$, and adjusting G such that this relationship between E' and $\Delta h$ holds at all magnitudes of R, the desired value of G will continuously form a part of the closed-loop coupler system. Used in this form, E' and $\Delta h$ become the electronic and geometric parameters above, respectively, required to form inputs to the gain changer.

It is nearly impossible to determine $\Delta h$ without knowing the local height of the beam ($\Delta h$ is the difference between beam height and airplane height). However, an equally-valid substitute for Equation 5, for a fixed R, is its derivative:

(6) $$\dot{E} - K_s \Delta \dot{h} = 0$$

In this form, inputs are more readily available. I will now describe means in FIGURE 3 of obtaining signals corresponding to $\dot{E}'$ and $\Delta \dot{h}$.

*Geometric gain changer input* ($\Delta \dot{h}$).—The geometric signal, $\Delta \dot{h}$, can be obtained by inertial sensing as by a vertical velocity sensor 62 FIGURE 3. By definition of $\Delta h$, $\Delta \dot{h}$ may be written:

(7) $$\Delta \dot{h} = \dot{h}_{beam} - \dot{h}$$

where $\dot{h}$ is actual airplane rate of descent and $\dot{h}_{beam}$ is the rate at which the glide slope beam centerline is descending, corresponding to aircraft forward velocity. Beam rate of descent is not available to use, but may be approximated by taking a long-term average of craft actual rate of descent, since the aircraft path will be oscillating around the beam path. This approximation in lag device 65 may be made by a 10-second lag, thus (8) $$\dot{h}_{beam} = \dot{h}\left(\frac{1}{1+10_s}\right)$$

which, when combined with (7) at summing device 64, yields an expression for $\Delta \dot{h}$:

(9) $$\Delta \dot{h} = \dot{h}\left[\frac{1}{1+10_s} - 1\right] = \dot{h}\left[\frac{-10_s}{1+10_s}\right]$$

Hence, by shaping a measured or sensed value of airplane actual rate of descent $\dot{h}$, with a long time-constant high-pass, one of the two required inputs is obtained.

Figure 4:
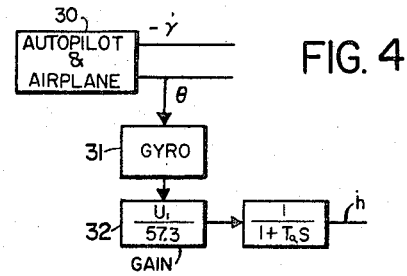
FIGURE 4 is a block diagram of an alternative mode of obtaining altitude rate.

One further simplification illustrated in FIGURE 4, which eliminates the need for specifically a rate-of-descent sensor 62, comes from the dynamic approximation

(10) $$\gamma = \theta\left(\frac{1}{1+T_a s}\right)$$

where
$\gamma$ = flight path angle, and
$T_a$ = aircraft time constant.
$\theta$ = aircraft pitch attitude, sensed by a vertical gyro 31 for example.

This flight path angle can be combined with aircraft forward velocity, $U_1$, to form an approximation to craft rate of descent $\dot{h}$:

(11) $$\dot{h} = \frac{\gamma U_1}{57.3} = \theta\left[\frac{\frac{U_1}{57.3}}{1+T_a s}\right]$$

By using this form, only a readily-available attitude signal ($\theta$) is used for the geometric input to the gain changer.

Figure 5:
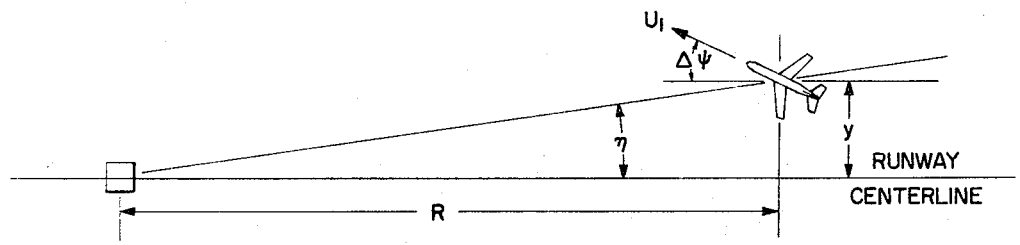
FIGURE 5 is a diagram similar to FIGURE 1 but representing the localizer beam and the relative position of the aircraft.

It will also be apparent that in FIGURE 5, $\Delta \psi$ is the heading of the aircraft relative to the beam center direction as obtained conventionally from gyroscope means. This sensed quantity, for the localizer problem, is one input to the gain device 32 FIGURE 4. The second input for the gain changer would be aircraft beam displacement, $\eta$, conventionally obtained from a localizer radio receiver similar to receiver 43 FIGURE 3 to supply the electrical signal that is to be modified.

The use of a dynamic relationship, Equation 10, is justified because any steady-state offsets are washed out by the subsequent high-pass of Equation 9. This geometric input and its shaping then form the "up-logic" channel 60 of the gain changer:

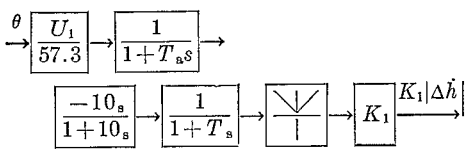

*Electronic gain changer input* ($\dot{E}'$).—The electronic measure of aircraft position, E', is available at the output of the variable gain, G. Since the comparison equation being used (Equation 6) requires the time derivative of this signal, the conventional method of high-passing through network 52 in FIGURE 3 with an appropriate time constant by gain device 54 is used:

$$\dot{E}' = E'\left(\frac{T_s}{1+T_s}\right)\left(\frac{1}{T}\right)$$

The geometric input $\Delta \dot{h}$ is lagged by device 68 with this same time constant T to keep the inputs to summer 58 in phase. This electronic input, its high-pass shaping, and an absolute value function form the "down logic" channel 51 of the gain changer:

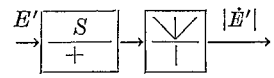

*Guide-slope coupler gain changing.*—When combined as in FIGURE 3 into a mechanization of a servo loop gain changer with both signals rectified, it can be seen that the geometric parameter circuit 60 drives the gain higher and the electronic parameter circuit 51 drives the gain lower. Any aircraft vertical motion will send inputs into both of these channels, causing the gain to seek a level corresponding to the desired value for that R.

*Gain changing without disturbances.*—An interesting feature of this mechanization is the fact that the gain will change in a near-optimum manner without any disturbances or noise.

This system gain is repeated here:

(12) $$\frac{E'}{\Delta h} = \frac{KG}{R}$$

from which an expression for the actual time derivative of E' can be written:

(13) $$\dot{E}' = \frac{KG}{R}\Delta \dot{h} + \frac{K\Delta h}{R}\dot{G} + K\Delta h G \frac{(-\dot{R})}{R^2}$$

(14) $$\dot{E}' = \frac{KG}{R}\Delta \dot{h} + \frac{K\Delta h}{R}\left(\dot{G} + \frac{GU_1}{R}\right)$$

where $U_1$ is aircraft approach velocity ($U_1 = -\dot{R}$). For a steady-state approach with no disturbances, $\Delta \dot{h}$ is zero. Setting $\Delta \dot{h} = 0$ and rearranging we have

(15) $$\dot{G} = \frac{R\dot{E}'}{K\Delta h} - \frac{U_1 G}{R}$$

Now, it can be seen that the particular mechanization of the relationship driving the gain changer is

(16) $$|\dot{E}'| - K_1|\Delta \dot{h}| = \frac{\dot{G}}{100}$$

since an integrator, which may be a motor, actually turns the gain device such as a voltage divider termed here a servo pot, and the gain of that integrator is 100. For the zero-disturbance case being considered here ($\Delta \dot{h} = 0$), this expression is equivalent to (for positive values of $\dot{E}'$, anyway)

(17) $$\dot{E}' = \frac{\dot{G}}{100}$$

Combining this with Equation 15, and rearranging, an expression for the rate of change of gain is obtained:

(18) $$\dot{G} = \frac{-U_1 G}{R}\left(\frac{100 K \Delta h}{100 K \Delta h + R}\right)$$

For the value of glide-slope receiver gain being used here ($K=500$ volt/radian), it is seen that $\dot{G}$ is almost independent of $\Delta h$ especially for small values of R. It depends only on R and the current value of G. A steady-state value of $\Delta h$ is present because of the attitude control loop in the autopilot. The autopilot in its pitch axis control system cannot maintain contradictory commanded values of both attitude and altitude, so a certain amount of $\Delta h$ "hang-off" is maintained all the way down the glide-slope. The gain then changes itself according to Equation 18. The gain changer is, in effect, "sensing" that the aircraft is flying into the apex of the beam.

It will now be apparent that there has been provided an improved I.L.S. coupler of the adaptive type which provides a positive beam guidance output, either to an indicator for aiding a pilot to follow a beam or to an automatic pilot, all the way from intercept and this is accomplished by a continuous internal adjustment of system gain wherein the variable-gain function is the maintenance of a desirable gain level (and hence handling qualities) through the entire approach. While the system described forms an outer loop control to the autopilot pitch axis and is driven or controlled by an instrument landing system glide-slope signal, it is apparent that the arrangement may form an outer loop for the autopilot roll axis and would thence receive an input from an I.L.S. localizer receiver. Therefore while the invention has been described in one preferred embodiment thereof it is to be understood that changes may be made therein without departing from the spirit of the invention.

What is claimed is:

1. For an automatic pilot for causing an aircraft to follow a beam, a radio beam coupler whereto a radio beam error signal is provided upon departure of the craft from a glide-slope beam, said error signal normally varying in magnitude for the same vertical displacement of the craft from the beam center, as the aircraft approaches the transmitting source of the beam;
variably adjustable gain changing means in said coupler for varying the ratio of output to input thereto responsive, for gain changing purpose, to the rate of change of altitude of the craft and additionally receiving as an input thereto for gain changing purpose said beam error signal modified by the coupler and effective thereon to provide an error signal output having a constant ratio of beam error to vertical displacement of the craft from the beam as the craft approaches the transmitting station.

2. In a beam coupler wherein an error signal is provided upon departure of the craft from a radio beam, said signal normally varying in magnitude despite the same linear transverse departure of the craft from the beam in the same direction, as the craft approaches the transmitting source of the beam;
coupler gain means receiving said signal as an input thereto and including an adjustable gain device for modifying said error signal to provide as an output a signal having a constant ratio of error signal to linear departure from the beam as the craft approaches the transmitting station, said adjustable gain device for the coupler gain means comprising:
further means responsive to the rate of linear departure of the craft from the beam, additional means responsive to the output of the gain device, comparing means connected to the further and additional means, means for integrating the output of the comparing means, and means connecting the integrator and adjustable gain device whereby said gain device is adjusted in accordance with the output of the integrator.

3. In a slide-slope radio beam adaptive coupler wherein an error signal is provided upon displacement of a craft from a radio beam, said error signal normally varying in magnitude for the same altitude displacement of the craft from the glide-slope beam, as the craft approaches the transmitting source of the beam; gain changing means modifying said error signal to provide an output signal constant for constant altitude displacement as the craft approaches the source comprising first means responsive to the rate of change of altitude of the craft;
second means responsive to the modified beam error signal, means algebraically combining the altitude rate and modified error signal, means integrating the output of the combining means, a gain device in the gain changing means adjusted by the integrating means and which receives said error signal, whereby the gain device for different horizontal ranges of the craft provides an output having a constant ratio of error signal to altitude displacement of the craft from the radio beam.

4. In an adaptive coupler, having signal receiving and output provisions, for use on a craft with an instrument landing system radio receiver which provides an electrical variable signal to the receiving provision as an input to the coupler in accordance with departure of the craft from an I.L.S. beam, means comprising:
adjustable gain means in said coupler receiving said signal, further means operating the gain means thereby varying the gain applied to the electrical signal to vary the ratio of the output to the input of the adjustable gain means for the same input signal, said further means including first means responsive to craft position in the electrical field defining the beam, second means responsive to a function of craft motion in the plane of the electrical field said motion having a component transverse to said beam and third means comparing the magnitude of responses of the first and second means.

5. The apparatus of claim 4, wherein the second means is responsive to the vertical velocity of the aircraft, and the first means is responsive to the angular departure of the craft from the I.L.S. beam in accordance with the radio receiver output, E, with the varying gain applied to said receiver output.

6. The apparatus of claim 4, wherein the third means is supplied from the second means with a quantity varying with the rate of change of altitude of the craft and the first means receives an input in accordance with angular displacement of the craft from the beam center.

7. The apparatus of claim 6 wherein the second means includes means providing an output $$\Delta \dot{h} = \dot{h}\left[\frac{-10s}{1+10s}\right]$$

wherein $s$ is the conventional Laplace operator, $\dot{h}$ is the craft vertical velocity, and $\Delta \dot{h}$ is the craft vertical velocity relative to the beam.

8. The aparatus of claim 4 wherein the input to the second means varies in accordance with craft pitch attitude, $\theta$, and the input to the first means varies in accordance with the radio receiver output, E, with the adjusted gain applied to said receiver output.

9. The apparatus of claim 4 wherein the third means has one input supplied thereto from the second means in accordance with the difference between beam rate of descent and the aircraft rate of descent, and the input supplied thereto from the first means is in accordance with the receiver signal as modified by the adjusted gain.

10. The apparatus of claim 4 wherein the input to the second means varies in accordance with the craft heading or azimuth angle and the input to the first means varies in accordance with the radio receiver output, E, with the adjusted gain applied to said receiver output.

11. In combination including an instrument landing receiver responsive to radio beams and providing an electrical signal in accordance with a distance of the craft from the center of the radio beam, and a beam coupler receiving said signal and providing an output signal having components only of said electrical signal for control purposes; adjustable gain means in said coupler modifying the relationship of the coupler received and output signals, to provide a coupler output signal having a constant magnitude for various craft positions for various ranges of the craft from the radio beam transmitting station but with the same distance from the center of the beam; means adjusting the amplification factor or gain of the adjustable gain means from the output signal of the coupler; and further means providing a signal varying as a function of the distance of the craft from said beam and additionally adjusting said adjustable means.

12. The apparatus of claim 11, wherein the function of said distance of the craft from the beam is the rate of change of said distance.

References Cited

UNITED STATES PATENTS

| | | | |
|---|---|---|---|
| 2,439,044 | 4/1948 | Terrill | 343—108 |
| 2,987,275 | 6/1961 | Moncrieff-Yeates et al. | 343—108 X |
| 3,058,699 | 10/1962 | Osder | 343—108 X |
| 3,099,007 | 7/1963 | Kittrell | 343—107 |
| 3,172,624 | 3/1965 | Parker | 244—77 |

RODNEY D. BENNETT, *Primary Examiner.*

CHESTER L. JUSTUS, *Examiner.*

H. C. WAMSLEY, *Assistant Examiner.*